(12) United States Patent
Haskin

(10) Patent No.: US 9,303,766 B2
(45) Date of Patent: Apr. 5, 2016

(54) OIL SEAL FOR DELCO REMY 50DN OIL COOLED, HEAVY DUTY AUTOMOTIVE ALTERNATOR

(71) Applicant: Casey Sean Haskin, Sparks, NV (US)

(72) Inventor: Casey Sean Haskin, Sparks, NV (US)

(73) Assignee: ROMAINE ELECTRIC, Kent, WA (US)

( * ) Notice: Subject to any disclaimer, the term of this patent is extended or adjusted under 35 U.S.C. 154(b) by 525 days.

(21) Appl. No.: 13/789,585

(22) Filed: Mar. 7, 2013

(65) Prior Publication Data

US 2013/0234544 A1    Sep. 12, 2013

Related U.S. Application Data

(60) Provisional application No. 61/608,100, filed on Mar. 7, 2012.

(51) Int. Cl.
| | |
|---|---|
| *H02K 9/19* | (2006.01) |
| *F16J 15/16* | (2006.01) |
| *H02K 5/124* | (2006.01) |
| *F16J 15/32* | (2006.01) |

(52) U.S. Cl.
CPC .............. *F16J 15/16* (2013.01); *F16J 15/3244* (2013.01); *H02K 5/124* (2013.01); *H02K 9/19* (2013.01)

(58) Field of Classification Search
CPC ....... F16J 15/16; F16J 15/3244; H02K 5/124; H02K 9/19
USPC ............................................ 310/54, 60 A, 61
See application file for complete search history.

(56) References Cited

U.S. PATENT DOCUMENTS

| | | | | | |
|---|---|---|---|---|---|
| 3,596,120 | A | * | 7/1971 | Potter | H02K 9/19 310/41 |
| 5,385,351 | A | * | 1/1995 | White | F16J 15/3224 277/572 |
| 6,825,586 | B2 | * | 11/2004 | Edrington | H02K 5/225 310/68 D |
| 8,421,297 | B2 | * | 4/2013 | Stout | H02K 1/02 310/214 |
| 2006/0208584 | A1 | * | 9/2006 | Kirkman | H02K 5/225 310/71 |
| 2011/0084561 | A1 | * | 4/2011 | Swales | H02K 9/19 310/54 |

* cited by examiner

Primary Examiner — Naishadh Desai
(74) Attorney, Agent, or Firm — John D. Long, Esq; Long & Chybik

(57) ABSTRACT

One possible embodiment of the invention could be an oil seal for a DELCO REMY 50DN heavy duty automotive alternator comprising a top collar; a bottom collar nested within the top collar to form a ring body; an annular polymer sealing member attaches to the top collar to form a mating flange that generally extends from an inner edge of the top collar to further denote a portion of an inner passage of the oil seal, the mating flange forming clockwise orientated splines to substantially denote a set return grooves in a spaced-apart, parallel, and clockwise orientation; wherein during alternator operations, a spacing collar spinning within the inner passage brings oil from the interior of the alternator into contact with the mating flange, the splines on the mating flange then direct the oil to the return grooves, which then direct the oil back towards the interior of the alternator.

7 Claims, 5 Drawing Sheets

OIL SEAL FOR DELCO REMY 50DN OIL COOLED, HEAVY DUTY AUTOMOTIVE ALTERNATOR

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention generally relates to the field of oil seals for heavy-duty, oil cooled automotive alternators. More particularity, the invention generally relates to those oil seals used in the Delco Remy 50DN oil cooled, heavy duty automotive alternator.

BACKGROUND

Alternators generally take mechanical power (e.g., as may be supplied by an internal combustion engine of an automotive vehicle) and covert it to electrical power to generally power the automotive vehicle's electrical system (e.g., to run lights, to charge a battery and the like) when the automotive vehicle's engine is running. Such automotive alternators may substantially comprise of a rotating permanent magnet/electromagnet known as rotor, which generally spins within a hollow interior of a stator (e.g., a stationary set of insulated wires or conductors wound in coils [e.g., stator windings] around a tube-shaped frame.) The stator/rotor combination is generally encapsulated within a housing that generally defines the outside of the automotive alternator. As the mechanical action (e.g., turning of crankshaft of the automotive engine during operation) is transmitted to a drive shaft attached to the rotor, the rotor spins within the stator. This rotor rotation generally creates or induces an electrical (e.g., alternating) current (e.g., also known as AC) within the stator windings. This AC current may then be substantially transferred to a device (e.g., a bridge rectifier) to be convert it to DC (i.e. Direct Current) current for use in powering the vehicle's electrical system and alike.

The alternator housing for the rotor/stator combination could comprise of hollow housing, namely a cylindrical casing generally sandwiched between (e.g., substantially enclosed by) a drive end covering and a rectifier end covering. The rectifier end cover may further feature a rotor end bearing, bridge rectifier, and alike. Generally, a non-drive shaft end of the rotor is movably seated in the rotor end bearing of the rectifier end cover but the rotor itself does not pass out through rectifier end cover. The bridge rectifier (or alike) may be seated proximate to the rectifier end covering and be electrically connected to the stator windings to receive the AC current that the alternator creates. The bridge rectifier may additionally be electrically connected to the vehicle's electrical system to send the converted (to DC) current to power the vehicle's electrical system.

The drive end cover may support of one or more rotor shaft bearings, an oil seal, and the like wherein a portion of the rotor's drive shaft substantially passes through the drive end cover (and the respective rotor shaft bearing[s] and oil seal.) That portion of the rotor's drive shaft is generally connected to the automotive vehicle's engine, allowing the engine to mechanically power the alternator.

In heavy-duty automotive alternator applications, the resulting current generation may also result in a high heat output. To deal with this issue, the housing interiors are generally sealed off from the outside environment to allow oil from the engine to circulate through the alternators and dissipate the generated heat.

One such heavy-duty automotive alternator could be the Delco Remy 50DN oil-cooled, heavy-duty automotive alternator as manufactured, and remanufactured, by Remy International, Inc, 600 Corporation Drive, Pendleton, Ind., USA 46064 for widespread use in commercial automotive applications such passenger buses and other heavy-duty, wheeled transport vehicles. This alternator's drive end cover can be seen as generally having a circular plate body defining an exterior side and an interior side, the interior side acting in concert with the housing as otherwise sealed by the rectifier end cover to generally encapsulate the stator and rotor within an oil-containing interior environment. The drive end cover's exterior side may present a mounting means or like to locate the alternator proximate to its respective powering engine. In the middle of the drive end cover and further connecting interior side with the exterior side may be a central aperture through which a portion of the rotor's drive shaft passes to the outside of the alternator. Seated inside this central aperture may be a recess that is generally located proximate to the drive end cover's interior side, the recess may further contain a ring bearing. A portion of the rotor's drive shaft passes through this bearing and spins within the bearing during alternator operation. Proximate to the drive end cover's outer side and within the central aperture may be a seated a ring-shaped oil seal. Generally seated between the rotor's drive shaft and oil seal's inner passage may be a tubular-shaped spacing collar. The spacing collar may slide over and marry the outer portion of the rotor's drive shaft with the oil seal. In this manner, an external surface of the spacing collar can be seen as presenting a generally continuous surface from the outer portion of the rotor's drive shaft passing through the oil seal that is in continuous movable contact against the mating flange of the oil seal. The oil seal's mating flange being further constructed to generally exert pressure against the external surface of the surface collar. During operation, the oil seal stays stationary with respect to drive end cover while oil's seal's mating flange substantially presses against the external surface of the spacing collar as the spacing collar/rotor drive shaft generally rotates together within the oil seal, the oil seal's purpose being the prevention of the leakage of oil from the alternator's interior to its exterior.

One possible issue with the Delco Remy 50DN Oil-Cooled, Heavy-Duty Automotive Alternator, starting from its market introduction nearly forty years ago, could be oil leakage occurring from its oil seal. This oil leakage can be significant enough in certain cases that oil could leak out onto exterior and onto rotating engine linkage/rotor drive shaft. The motion of exterior drive shaft/linkage combination could then spray the leaked oil all over the engine compartment. While such spillage could be seen as being a nuisance in attracting dirt and grime, and its presence could further increase the potential, and seriousness, of fire in the engine compartment as well.

It is believed that this leakage may be a result of construction or design flaw in the mating surface of the OEM oil seal that prevents the mating flange from adequately returning the oil riding upon the spacing collar back towards the oil-containing interior of the alternator.

Another possible oil leakage condition could be when the OEM ("Original Equipment Manufacturer") oil seal is not properly aligned when the oil seal is being fitted within the drive end cover. This lack of proper alignment could subsequently cause an improper mating of the mating flange of the oil seal and the respective outer surface of the space collar with resulting premature wear of the mating flange causing oil leakage. This improper mating could also cause a gap to occur between the oil seal and its seat in the drive end cover that allow oil leakage to occur from between the oil seal and its respective seat. Improper mating could also result if that the OEM oil seal has worn out or otherwise has subsequently failed to prevent oil from leaking out of the alternator.

As shown in FIGS. 1 and 2, the OEM (Original Equipment Manufacturer) oil seal (e.g., prior art) 200 used to seal the drive shaft of the Delco Remy 50DN oil-cooled, heavy-duty automotive alternator 100 comprises substantially of a top collar, a bottom collar, and an annular polymer sealing member. The top collar generally comprises of a top wall flange has an inwardly disposed top rim along outside edge of the top collar. This connection substantially places the top rim in a generally perpendicular orientation to the top wall flange. The bottom collar may comprise of a bottom wall flange that generally connects to a bottom ring to substantially form a mutual edge running continuously along an outside edge of the bottom ring. This connection substantially places the bottom ring in a generally angular orientation to the bottom wall flange. The bottom collar may be nested into the top collar wherein an outer side of the bottom collar is placed against an inner side of the top wall flange while the top rim and bottom ring are generally held apart from one another. The lower edge of the top wall flange may be knurled slightly inward to generally retain the bottom flange wall holding the two collars together.

The annular polymer sealing member may attach to an interior edge of the top rim to generally denote the inner passage or channel of the OEM oil seal 200. This annular polymer sealing member may further be comprised of concentric accordion-style folds to generally allow flexible adjustment in the size of the circumference of the mating flange of the annular polymer sealing member as it contacts the spacing collar. A coiled spring placed into a spring groove on a non-mating (e.g., the back side) surface of the mating flange generally moves or otherwise bias the mating flange towards a secure, yet movable contact with the spacing collar.

The mating surface may further project a radial raised ridge that may be proximate to the bottom of the mating surface. A top edge of the radial raised ridge may denote a side of a radial channel upon the mating surface, the other side of the radial channel being demarcated by an inwardly canted radial projection or flange (that may also further contact the spacing collar) at the top of the sealing member.

The radial raised ridge may further present a set of angularly-oriented, spaced apart, non-parallel splines. It is believed that originally the driveshaft of the Delco Remy 50DN oil-cooled, heavy-duty alternator in at least one application rotated clockwise and for another automotive application, the driveshaft rotated counterclockwise. To accommodate these two opposing rotational movements, the OEM oil seal splines 76 are organized in a wave format with the splines 76 being alternatively disposed in left hand (counterclockwise) and right hand (clockwise) orientations. The splines 76 in alternating or wave-like orientation generally created a corresponding set of triangle-shaped return grooves 78. When the splines 76 contacted the oil brought by the spacing collar 104, the splines 76 were to generally direct the oil into the return grooves 78. The return grooves 78 were then generally expected to move oil back to the oil-filled alternator interior. This resulting dual application (e.g., alternating or wave-like spline 76 orientation/triangular-shaped return groove 78 orientation was found to be a less than effective means of redirecting oil from the spacing collar 104 back towards the oil-filled alternative interior and thus possibly contributing to the oil leakage issues occurring with Delco Remy 50DN oil-cooled, heavy-duty automotive alternators.

What may be needed therefore is new oil seal for drive end cover of Delco Remy 50DN Oil Cooled, Heavy Duty Automotive Alternator. Such a new seal could have an improved mating flange whose spline-based surface could cause oil moving between the spacing collar, splines, and return grooves to be more effectively returned to the oil-containing interior of the Delco Remy 50DN alternator housing. The new oil seal could be made structurally stronger top collar to resist warping that may occur when the new oil seal is seated within the drive end cover. The new oil seal could further have the annular polymer sealing member covering the outer side/bottom edge of the top wall flange of the top collar to generally increase the sealing capability of new oil seal to the drive end cover.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a new oil seal for Delco Remy 50DN alternator housing drive end cover that has stronger body to provide greater resistance to misalignment and warping forces that could occur during the placement of the new oil seal into the drive end cover;

the ability to have the mating flange of the new oil seal to more efficiently direct oil proximate to the spacing collar back towards oil-containing interior of the Delco Remy 50DN alternator in a manner that prevents oil leakage;

to provide an clockwise aligned and parallel spaced-apart splines on the mating flange of the oil seal for Delco Remy 50DN alternator housing drive end cover that directs oil into spaced apart, parallel, and clockwise oriented return grooves which more efficiently navigate the oil back into the alternator's oil-containing interior than does the original OEM oil seal;

the ability to reduce costs, parts and labor for replacing an oil seal over the lifetime of Delco Remy 50DN alternator;

providing a new oil seal for Delco Remy 50DN alternator housing drive end cover that reduces the amount of oil introduced into a engine compartment; and the ability to reduce buildup of oil accumulation in an engine compartment containing a Delco Remy 50DN alternator.

These and other advantages may be realized by reference to the remaining portions of the specification, claims, and abstract.

Brief Description of One Embodiment of the Present Invention

One possible embodiment of the invention could be an oil seal assembly for a Delco Remy 50DN oil cooled, heavy duty automotive alternator comprising a top collar; a bottom collar that is nested within the top collar; an annular polymer sealing member attaches to the top collar to form a mating flange that extends from an inner edge of the top collar to further denote a portion of an inner passage of the oil seal, the mating flange forming splines in a spaced-apart, parallel, and clockwise orientation to consequently create a set of return grooves; wherein during alternator operations, a spacing collar that spins within the inner passage brings oil from the interior of the alternator into contact with the mating flange, the splines on the mating flange then direct the oil to the return grooves, which then direct the oil back towards the interior of the alternator.

Another possible embodiment of the invention could be an 50DN oil-cooled, heavy duty automotive alternator comprising a stator having wire windings; a rotor rotatably contained within the stator, a drive shaft connected to the rotor; a housing encapsulating both stator and rotor within an oil environment, the oil-filled hollow housing terminating in a drive end cover and a rectifier end cover, wiring from the wire windings passes through the rectifier end cover to connect to a bridge rectifier while the driveshaft in passing through the drive end cover supports a spacing collar that movably connects to an oil seal supported by the drive end cover; wherein the oil seal comprises a top collar, a bottom collar, and an annular polymer sealing member, the bottom collar is nested within the top collar with the annular polymer sealing member further attaches to the top collar to form a mating flange having a set of parallel, spaced-apart splines that create a corresponding set of return grooves with parallel sides and organized in a clockwise orientation, the mating flange rides against the spacing collar.

Yet another possible embodiment of the invention could be a methodology for operating a 50DN heavy duty automotive alternator comprising the following steps providing a 50DN heavy duty automotive alternator having an hollow housing containing oil and a stator containing a rotor, windings of the stator connect to a rectifier; the rotor further having a drive shaft that supports a spacing collar that passes through an oil seal supported by the housing, the oil seal having a ring-shaped body supporting an annular polymer sealing member that forms a mating flange having a set of parallel, spaced-apart splines organized in a clockwise orientation that creates a corresponding set of return grooves with parallel sides and organized in a clockwise orientation, the mating flange rides against the spacing collar; rotating the spacing collar to bring the oil to the splines of the mating flange; directing the oil by the splines to the return grooves; and returning the oil back through the return grooves into the housing.

The above-description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
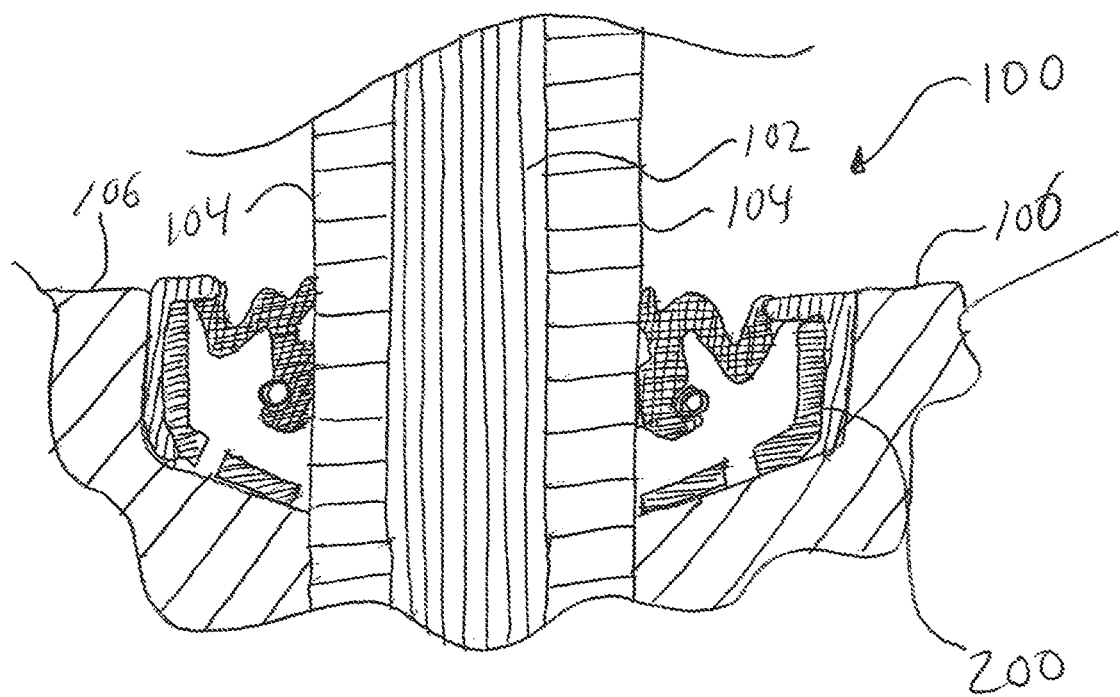
FIG. 1 is substantially a cutaway elevation view of prior art placed in the alternator.
Figure 2:
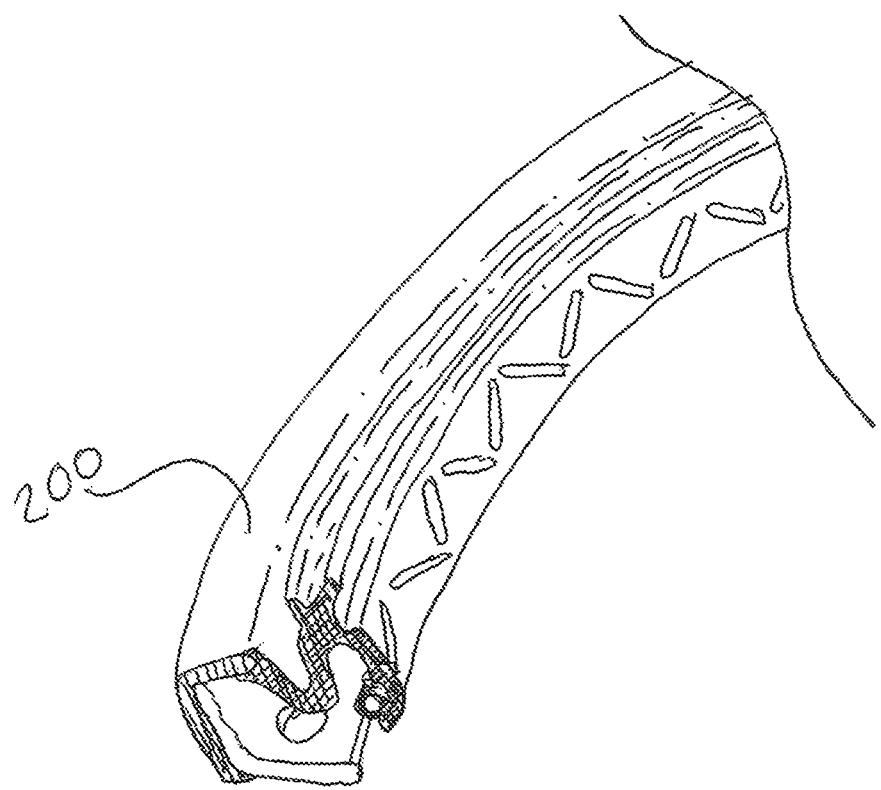
FIG. 2 is substantially a perspective cutaway view of the prior art.
Figure 3:
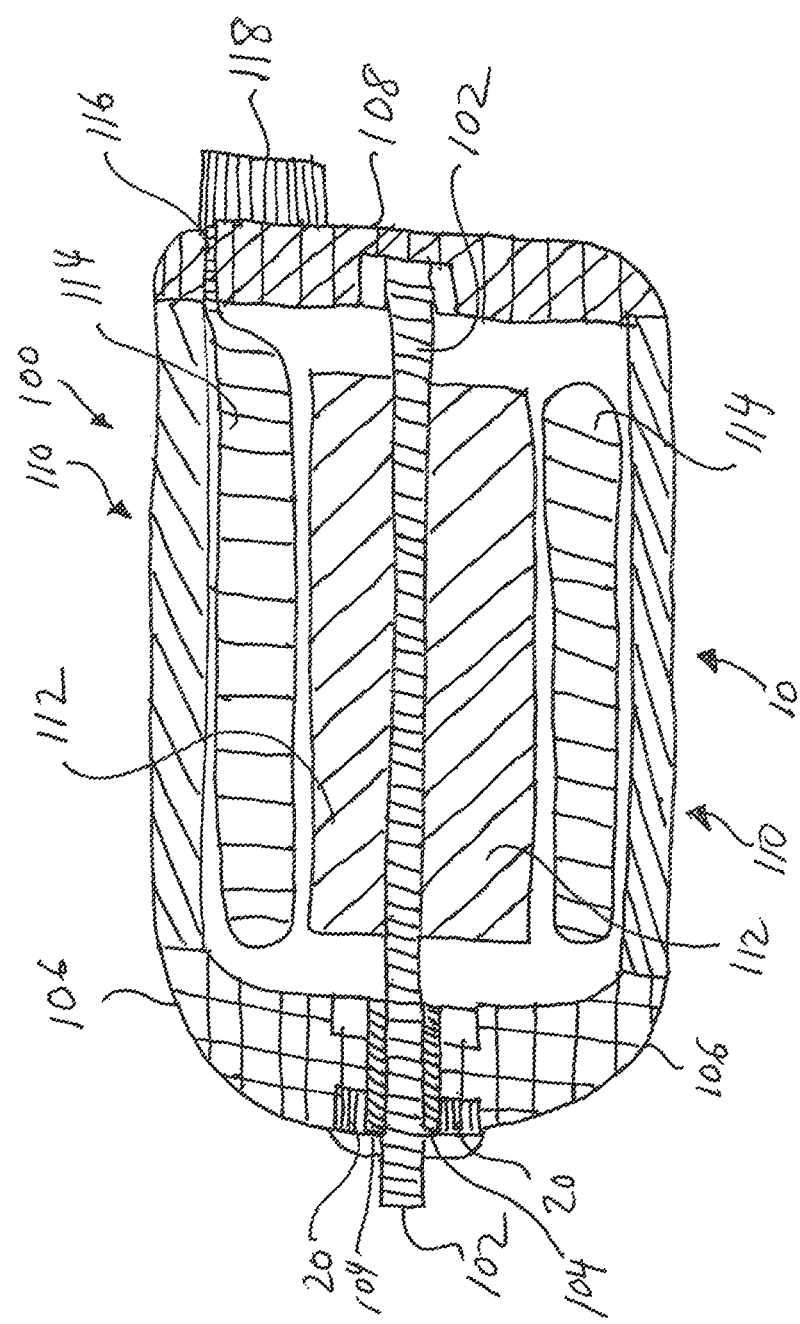
FIG. 3 is substantially an elevation cutaway view of the 50DN oil-coiled, heavy duty automotive alternator with the new oil seal.

As substantially shown in FIG. 3, the invention 10 could be a new oil seal 20 that may be used in a DELCO REMY 50DN heavy duty, oil cooled automotive alternator 100. The alternator 100 could comprise a housing 110 encapsulating both stator 114 and rotor 112 within an oil environment, the housing 110 could terminate in a drive end cover 106 and a rectifier end cover 108. Wiring from the wire windings 116 could pass through the rectifier end cover 108 to connect to a bridge rectifier 118 while drive shaft 102 passes through an oil seal 200 supported by drive end cover 106, the drive shaft 102 at least partially encompassed by a spacing collar 104 that comes into rotatable contact with the oil seal 20.

Figure 4:
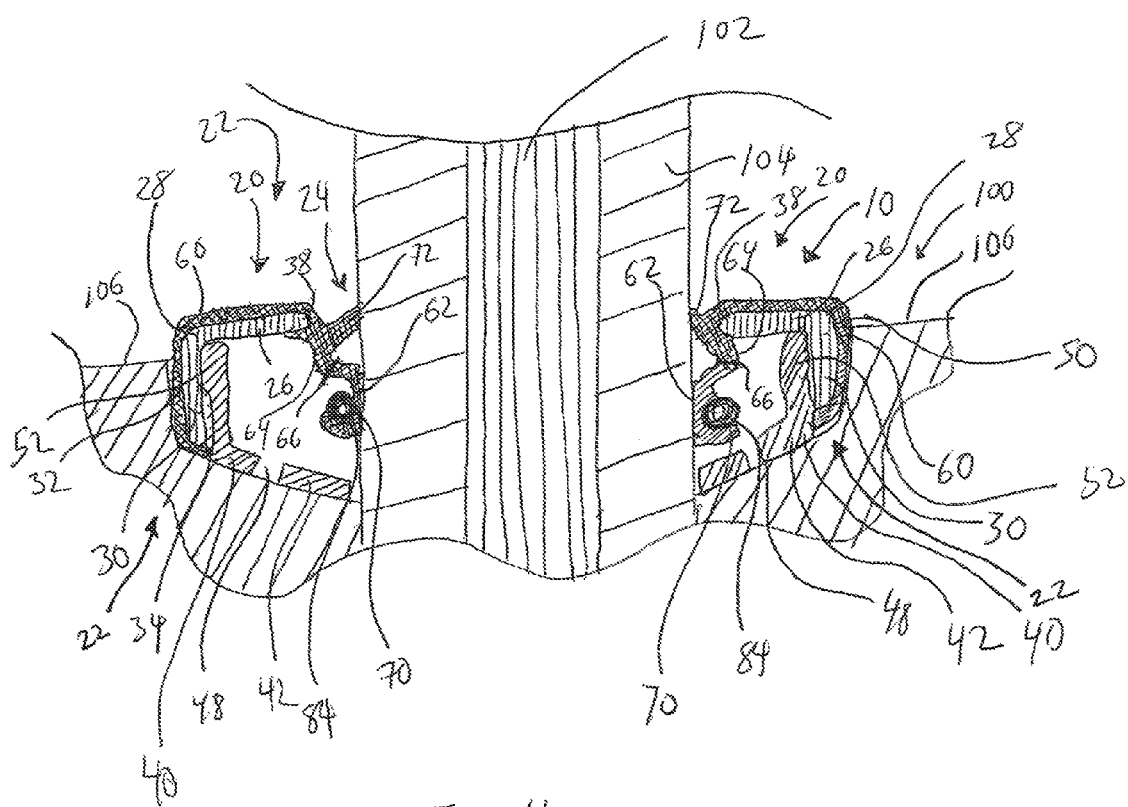
FIG. 4 is substantially an elevation cutaway view of one embodiment of the present invention as placed in the alternator.
Figure 5:
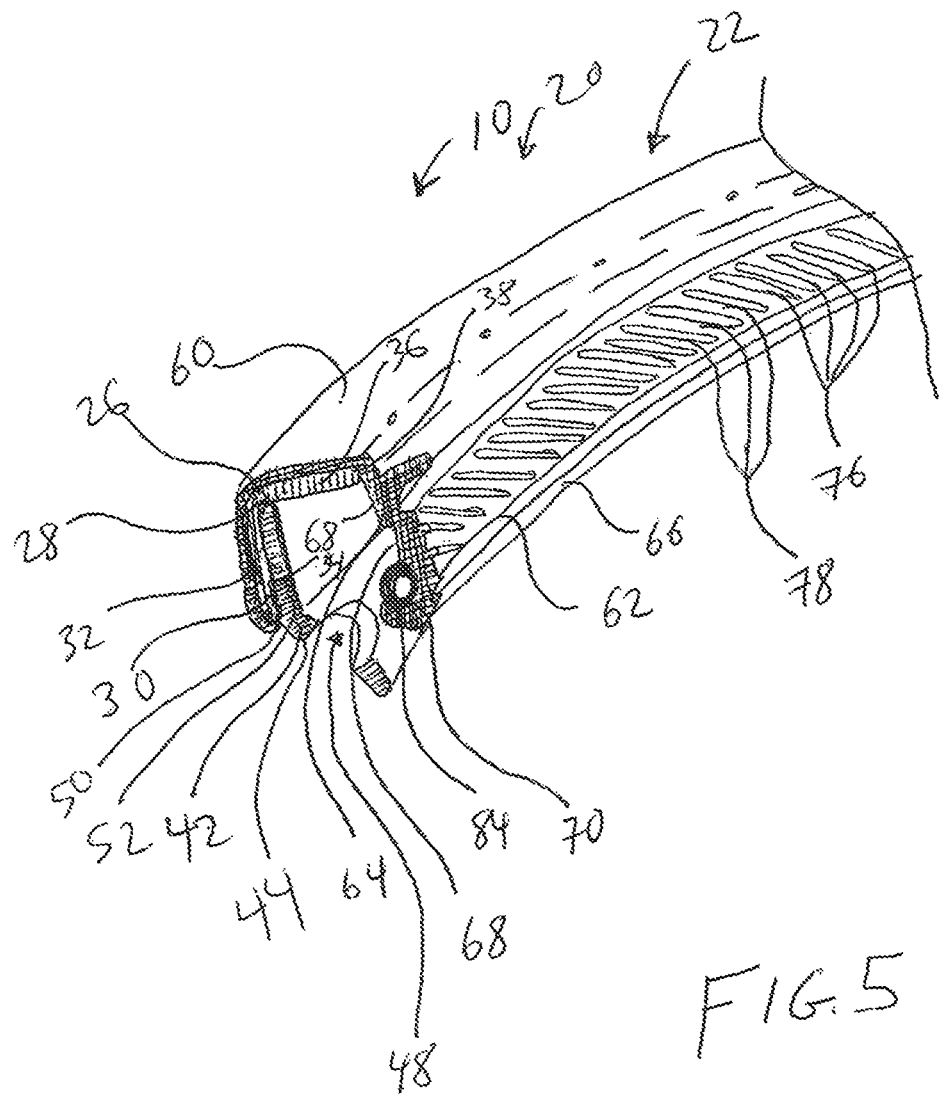
FIG. 5 is substantially a perspective cutaway view of one embodiment of the present invention.

As substantially shown in FIGS. 4 and 5, the oil seal 20 used may comprise of a top collar 26, a bottom collar 40, an elastic annular polymer sealing member 60 and an annular, coiled, tension spring 84. The top collar 26 may be constructed from suitable metal and could comprise of a top ring 36 connected along its outer edge 28 to an edge of a top wall flange 30 to form a mutual edge, the top ring 36 and top wall flange 30 then being oriented towards one another in a substantially perpendicular fashion forming an inverted L-shaped cross section. Covering an outside of the top ring 36 and an outside of the top flange wall 30 could be a portion of the annular polymer sealing member 60 that generally otherwise projects the member's mating flange 62 from an inner edge 38 of the top ring 36. The width of the top ring 36 (e.g., the distance between the inner and outer edges 28, 38 of the top ring 36) is generally greater than the corresponding top rim structure found on the OEM oil seal (e.g., the prior art) to avoid the need for the present annular polymer sealing member 60 to use the accordion folds of the OEM oil seal for properly placing the mating flange 62 in contact with the spacing collar 104. The additional metal structure (as compared to the OEM oil seal's top rim) as incorporated in the present top ring 36 is further thought to generally increase the overall strength and rigidity of the resultant body 22 (e.g., top collar 26 and bottom collar 40 combination) of the new oil seal 20. It is thought that this increase in the overall strength and rigidity of the body 22 could allow the new oil seal 20 to substantially resist (e.g., to an greater extent than the OEM oil seal) those warping forces generally occurring during the placement of the present oil seal 20 into the drive end cover 106 that would otherwise cause the misalignment of present oil seal 20 within the drive end cover 106. The general covering of outer side 32 of top wall flange 30 by a portion of the annular polymer sealing member 60 is generally thought to further improve the sealing fit between the present oil seal 20 and the drive end cover 106 of the Delco Remy 50DN alternator 100 as the body 22 and drive end cover 106 generally press against that portion of the annular polymer sealing member 60 to generally reduce the possibility of oil leakage occurring between the new oil seal 20 and drive end cover 106.

The mating flange 62 could be constructed with an S-shaped cross-section 64 wherein the top portion of the S could denote a protruding sealing edge 72 while the bottom portion of the S could denote a spring groove 70 on the non-mating side 68 of mating flange 62. Within the spring groove 70 could sit the annular, coiled, tension spring 84 to substantially constrict the inner passage 24 of the new oil seal 20 or further bias the mating side 66 of the mating flange 62 towards the spacing collar 104 as placed into the inner passage 24. The bottom portion of the S on the mating side 66 of mating flange 62 could further feature a set or plurality of splines 76 spaced-apart in an angled, right-hand or clockwise orientation (e.g., the top of the spline 76 is oriented to the left while the bottom of the spline 76 is oriented to the right.) This set of spines 76 could form a respective set of return grooves 78 that are generally spaced-apart and have parallel sides as denoted by the splines 76 rather than the triangular shape of the grooves created by the wave pattern placement of the splines 76 of the OEM prior art seal 300. The present return grooves 78 could also be seen as having a spaced-apart right-hand or clockwise orientation.

When oil upon the spacing collar 104 (e.g., that is spinning or rotating counter clockwise) comes into contact with the mating side 66 of the mating flange 62, the set of splines 76 could substantially engage such oil and generally direct it to the return grooves 78. The return grooves could then generally channel the oil back towards the oil-containing interior of the DELCO REMY 50DN Oil-Cooled, Heavy Duty Automotive Alternator 100.

The bottom collar 40 may be constructed from suitable metal and could be comprised of a bottom ring 42 mutually connected on its outside edge 44 to a mutual edge of a bottom wall flange 52, wherein the bottom ring 42 maintains a generally angular orientation with the bottom wall flange 52. The bottom ring 42 could further define a set of spaced-apart apertures 48 penetrating the bottom ring 42. As inserted into the top collar 26 to form the body 22, an outer side 50 of the bottom wall flange 30 would nestle against an inner side 34 of top collar's top wall flange 30 in at least a friction-fit to hold the two collars 26, 40 together forming a ring-shaped body 22 having a C-shaped cross-section. This placement could further orient the bottom ring 42 to be opposing and spaced apart from top ring 36. Further, the bottom ring 42 could be canted generally outwardly to move its inside edge 46 away from contact with the annular polymer sealing member 60 (as well as the spacing collar 104.)

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

As shown above, the invention provides for new oil seal for a DELCO REMY 50DN heavy duty, oil cooled automotive alternator, the oil seal having a mating surface with a set of clockwise-aligned splines producing a corresponding set of clockwise-aligned return grooves, the two sets working more efficiently that the OEM (prior art) seal to return oil upon the spacer collar rotating within the oil seal to the interior of the DELCO REMY 50DN alternator. Further, the increased width of the top ring of the top collar may significantly add to the overall structure integrity of the body of the invention affording it greater resistance than the prior art seal to warping forces when being inserted into the alternator. The placement of a portion of the annular elastic sealing member upon the outer side of the top flange wall of the top collar may further increase the sealing capability of the e oil seal where it is seated within the drive end cover of the DELCO REMY 50DN alternator.

What is claimed is:

1. A 50DN heavy duty, oil-cooled automotive alternator comprising:
    (A) a stator having wire windings;
    (B) a rotor rotatably contained within the stator, the rotor connected to a drive shaft;
    (C) a housing encapsulating both stator and rotor within an oil environment, the housing terminates in a drive end cover and a rectifier end cover, wiring from the wire windings passes through the rectifier end cover to connect to a bridge rectifier while rotor's drive shaft passes through the drive end cover and supports a spacing collar that passes through an oil seal supported by the drive end cover;
    wherein the oil seal comprises a top collar, a bottom collar, and an annular polymer sealing member, the bottom collar is nested within the top collar to form a ring-shaped body with the annular polymer sealing member further attaches to the ring-shaped body to form a mating flange having a set of parallel, spaced-apart splines that create a corresponding set of return grooves with parallel sides and organized in a clockwise orientation, the mating flange contacts the spacing collar.

2. The 50DN heavy duty, oil-cooled automotive alternator of claim 1 wherein the spacing collar spins counterclockwise within the oil seal to bring oil from an interior of the alternator into contract with the mating flange, the splines then direct the oil into the return grooves, which move the oil back towards the interior of the alternator.

3. The 50DN heavy duty, oil-cooled automotive alternator of claim 1 wherein the bottom collar further comprises a bottom ring and a bottom wall flange, the bottom wall flange angularly attaches to the bottom ring at a common mutual edge to inwardly direct an unattached edge of the bottom ring to denote a portion of the inner passage.

4. The 50DN heavy duty, oil-cooled automotive alternator of claim 1 wherein the nesting of the bottom collar within the top collar places an outer side of a bottom wall flange against an inner side of a top wall flange and a top ring is held spaced apart from a bottom ring.

5. The 50DN heavy duty, oil-cooled automotive alternator of claim 1 wherein the annular polymer sealing member further continuously extends over an outside of a top ring and an outside of a top wall flange.

6. The 50DN heavy duty, oil-cooled automotive alternator of claim 1 wherein a portion of the annular polymer sealing member is sandwiched between a top wall flange and the drive end cover.

7. The 50DN heavy duty, oil-cooled automotive alternator of claim 1 wherein a non-mating side of the mating flange further features a spring groove that supports an annular-shaped coiled spring that biases the mating flange towards the spacing collar.

\* \* \* \* \*